(12) United States Patent
Weng et al.

(10) Patent No.: US 6,397,610 B1
(45) Date of Patent: Jun. 4, 2002

(54) METHOD FOR CONTROLLING AIR CONDITIONER/HEATER BY COIL TEMPERATURE

(75) Inventors: Kuo-Liang Weng, Taichung Hsien; Ming-Tsun Ke, Taipei; Jing-Wen Weng, Taichung Hsien, all of (TW)

(73) Assignee: Cohand Technology Co., Ltd., Taichung Hsien (TW)

( * ) Notice: Subject to any disclaimer, the term of this patent is extended or adjusted under 35 U.S.C. 154(b) by 0 days.

(21) Appl. No.: 09/845,195

(22) Filed: May 1, 2001

(51) Int. Cl.[7] .............................................. F25B 39/00
(52) U.S. Cl. .............................. 62/179; 62/184; 62/186; 62/156
(58) Field of Search .......................... 62/160, 179, 180, 62/181, 182, 183, 184, 186, 151, 156

(56) References Cited

U.S. PATENT DOCUMENTS

| | | | |
|---|---|---|---|
| 4,120,173 A | * 10/1978 | Kimpel | .................... 62/184 X |
| 4,498,309 A | * 2/1985 | Kobayashi et al. | ............ 62/186 |
| 5,255,529 A | * 10/1993 | Powell et al. | .............. 62/181 X |
| 5,257,508 A | * 11/1993 | Powell et al. | .................. 62/180 |

* cited by examiner

Primary Examiner—Harry B. Tanner
(74) Attorney, Agent, or Firm—Rosenberg, Klein & Lee

(57) ABSTRACT

An air conditioner/heater automatically operates in either air conditioning or heating mode by coil temperatures of indoor and outdoor heat exchangers. In air conditioning mode, the rotating speed of indoor fan motor is proportional to the ambient temperature of corresponding enclosed space, and the rotating speed of outdoor fan motor is proportional to the coil temperature of corresponding outdoor heat exchanger. In heating mode, the rotating speed of indoor fan motor is proportional to the coil temperature of corresponding indoor heat exchanger, and the rotating speed of outdoor fan motor is inversely proportional to the coil temperature of corresponding outdoor heat exchanger. With this automatic switching of operation mode, the capability of heat dissipation of condenser is always larger than the capability of heat absorption of evaporator. Hence, the operation of the air conditioner/heater is maintained at an optimum.

10 Claims, 20 Drawing Sheets

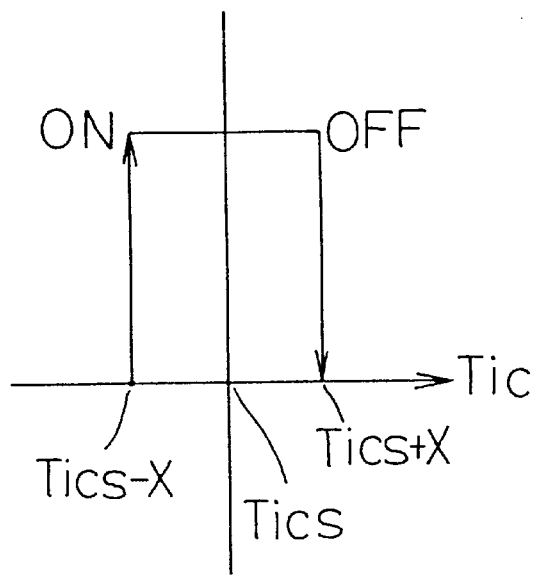
F I G. 19
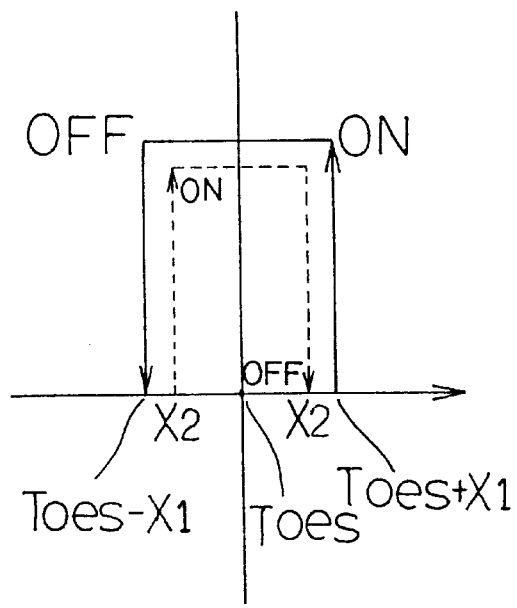
F I G. 20

METHOD FOR CONTROLLING AIR CONDITIONER/HEATER BY COIL TEMPERATURE

FIELD OF THE INVENTION

The present invention relates to air conditioner/heater and more particularly to a method for controlling the operation of air conditioner/heater by coil temperature.

BACKGROUND OF THE INVENTION

A conventional air conditioner 1 is shown in FIG. 1 comprising a compressor 11, a heat exchanger (e.g., condenser) 12, a fan motor 13, a filter 14, and a coolant flow controller 15 (all above components are installed outdoors). Air conditioner 1 further comprises a heat exchanger (e.g., evaporator) 16 and a fan motor 17 (both are installed indoors). With this configuration, it is possible to air condition an enclosed space (AO). However, the previous design suffered from several disadvantages. For example, the rotating speed of each fan motor is fixed, i.e., it is not made adaptable to ambient temperature (or coil temperature). As understood that, heat exchange capability of air conditioner is proportional to wind speed which in turn is proportional to motor speed. Thus, heat exchange capability is proportional to motor speed. Hence, the heat exchange capability of the air conditioner is low inherently due to such fixed rotating speed of fan motor, resulting in a waste of energy. Further, the capability of heat dissipation of condenser is always larger than the capability of heat absorption of evaporator. Hence, it is difficult for such conventional air conditioner to operate as heater when desired. Furthermore, the thermal efficiency is unacceptable low even when the air conditioner operates as heater. Thus, improvement exists.

SUMMARY OF THE INVENTION

It is an object of the present invention to provide a process for controlling an air conditioner/heater to switch to operate in either an air conditioning mode or a heating mode, the process comprising 1) in the air conditioning mode: sending ambient temperature of at least one enclosed space sensed by at least one sensor to a central processing unit (CPU) for comparison with a default value so that the rotating speed of each of at least one indoor fan motor is proportional to the ambient temperature of the corresponding enclosed space when the ambient temperature of the enclosed space is larger than the default value but smaller than the sum of the default value and a first predetermined offset; 2) in the air conditioning mode: sending at least one outdoor coil temperature sensed by the at least one sensor to the CPU for comparison with the default value so that the rotating speed of each of at least one outdoor fan motor is proportional to the corresponding outdoor coil temperature when the outdoor coil temperature is smaller than the default value but larger than the subtraction of the first predetermined offset from the default value; 3) in the heating mode: sending at least one indoor coil temperature sensed by the at least one sensor to the CPU for comparison with the default value so that the rotating speed of each indoor fan motor is proportional to the corresponding indoor coil temperature when the indoor coil temperature is smaller than the default value but larger than the subtraction of the first predetermined offset from the default value; and 4) in the heating mode: sending the at least one outdoor coil temperature sensed by the at least one sensor to the CPU for comparison with the default value so that the rotating speed of each outdoor fan motor is inversely proportional to the corresponding outdoor coil temperature when the outdoor coil temperature is smaller than the default value but larger than the subtraction of the first predetermined offset from the default value.

The above and other objects, features and advantages of the present invention will become apparent from the following detailed description taken with the accompanying drawings.

BRIEF DESCRIPTION OF THE DRAWINGS

FIG. 19 is a fifth graph illustrating the operation of compressor; and

FIG. 20 is a sixth graph illustrating the operation of compressor.

DETAILED DESCRIPTION OF THE PREFERRED EMBODIMENTS

Figure 1:
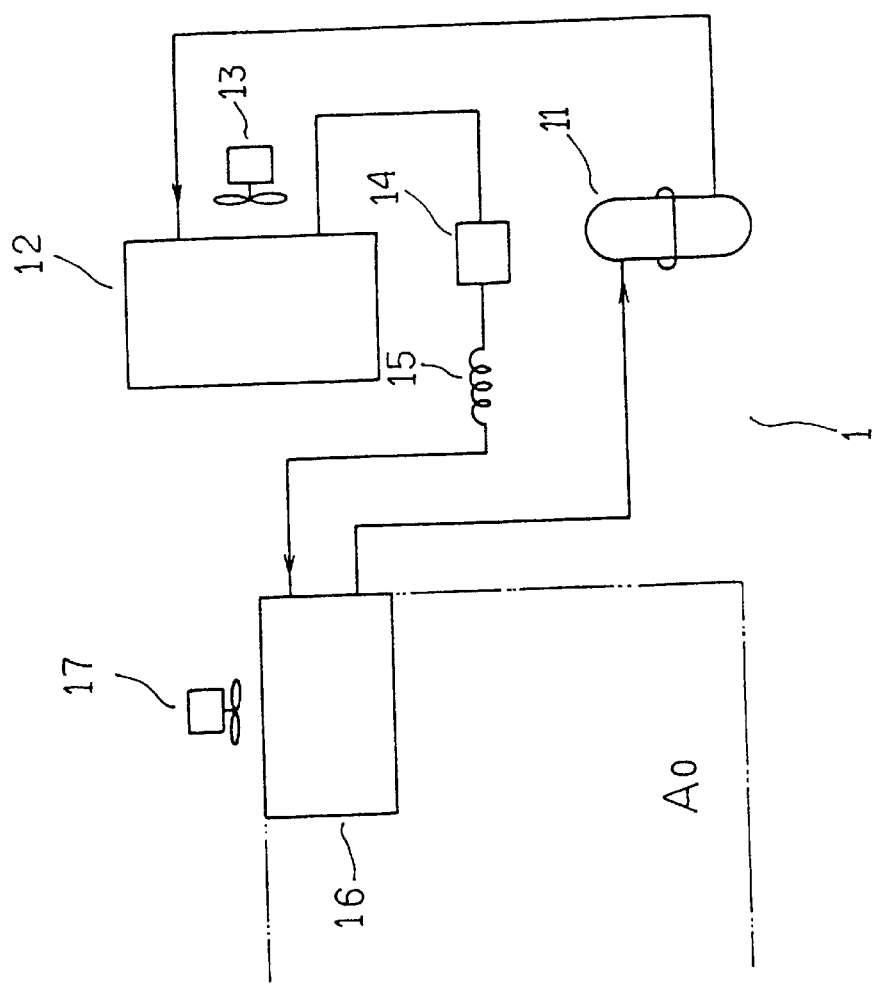
FIG. 1 is a schematic drawing of a conventional air conditioner.
Figure 2:
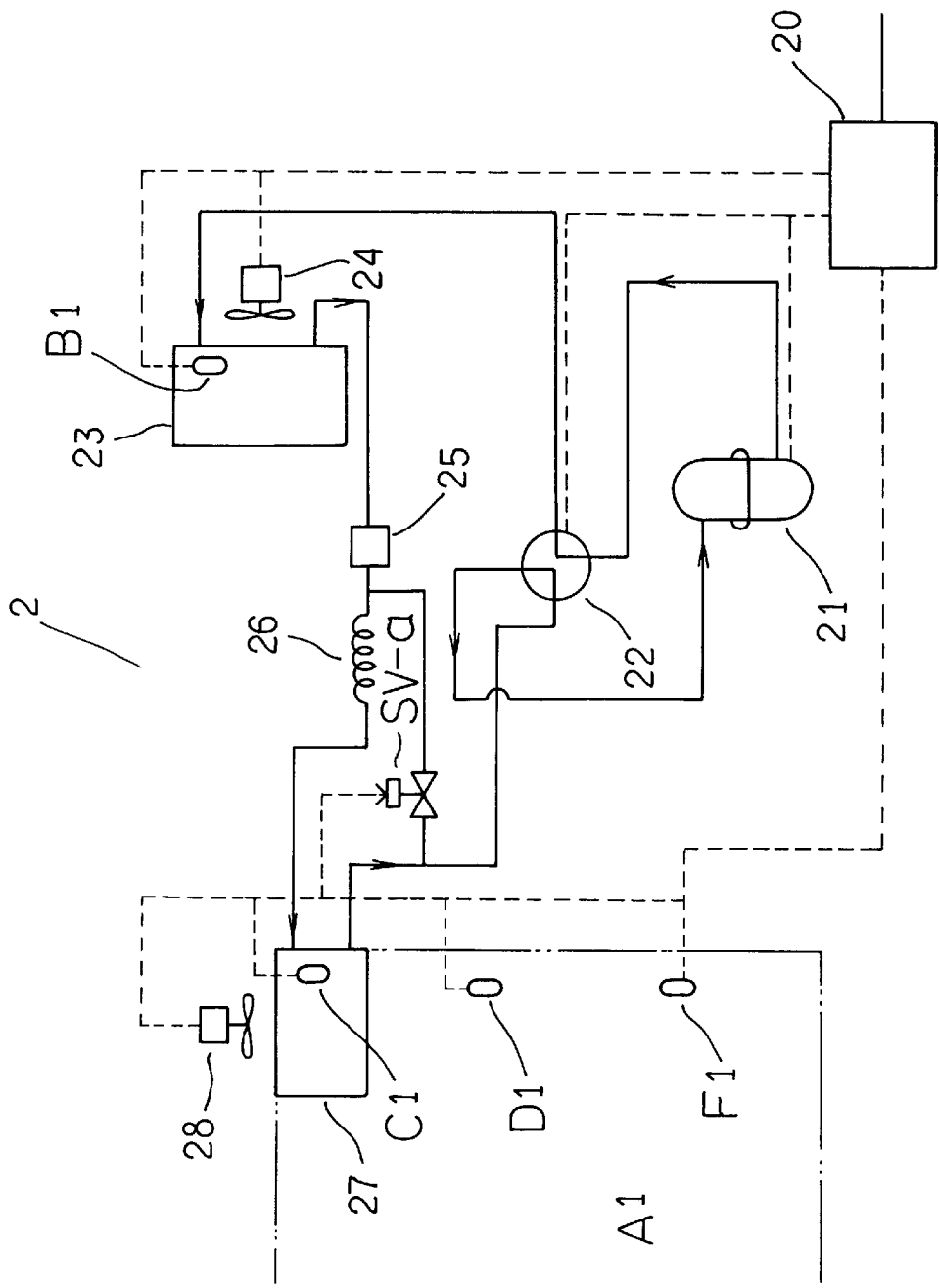
FIG. 2 is a schematic drawing of a first preferred embodiment of air conditioner/heater according to the invention.
Figure 3:
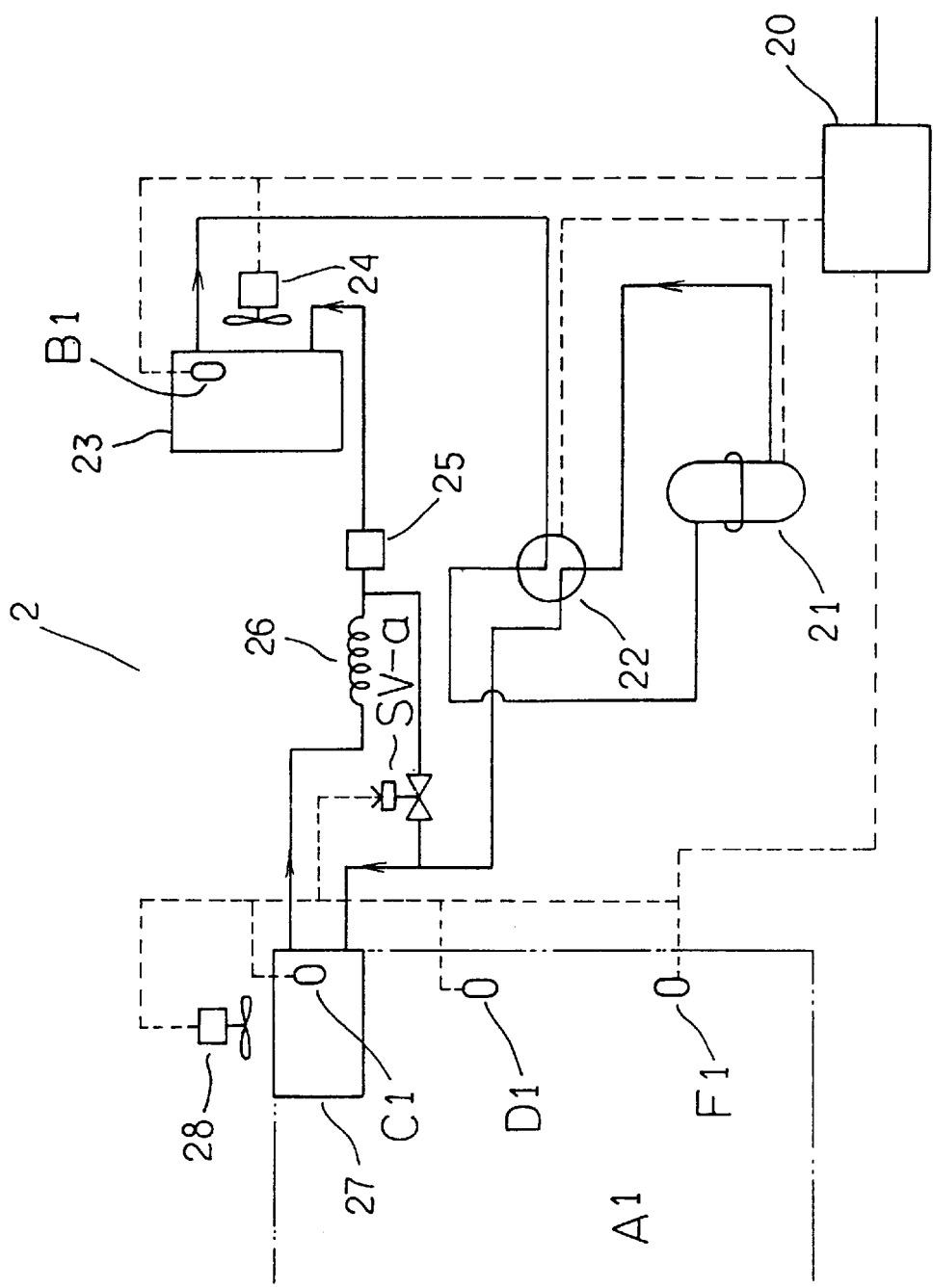
FIG. 3 is another schematic drawing of the first preferred embodiment shown in FIG. 2.

Referring to FIGS. 2 and 3, there is shown a first preferred embodiment of air conditioner/heater 2 constructed in accordance with the invention. The air conditioner/heater 2 is activated to air condition/heat a single room (i.e., enclosed space) A1. That is, this is a one-to-one mode. Air conditioner/heater 2 comprises a compressor 21, a heat exchanger 23, a fan motor 24, a filter 25, and a coolant flow controller 26 (all above components are installed outside the enclosed space A1). Air conditioner/heater 2 further comprises a heat exchanger 27 and a fan motor 28 (both are installed indoors). The air conditioner/heater 2 is controlled by a central processing unit (CPU) 20 through associated components such as a directional-control valve 22, a defrost bypass valve SV-a, a plurality of sensors B1, C1, and D1, and a control panel F1. With this system, it is possible to air condition or heat an enclosed space A1 (FIG. 2). CPU 20 may compare sensed values Tie, Tic, Toe, Toc, and Ta obtained from sensors B1, C1, and D1 with default values Ties, Tics, Toes, Tocs, and Tas. Accordingly, CPU 20 may control the on-off of compressor 21, the switch of directional-control valve 22 (i.e., switch between air conditioning and heating modes), the speed selections of fan motors 24 and 28, and the on-off of defrost bypass valve SV-a. Directional-control valve 22 may be switched to permit a specific coolant to flow through by the selection of air conditioning/heating mode (i.e., either in the case shown in FIG. 2 or FIG. 3). Sensors B1, C1, and D1 are located on outdoor heat exchanger 23, indoor heat exchanger 27, and enclosed space A1 respectively for sensing temperatures in order to obtain sensed values Tie, Tic, Toe, Toc, and Ta. Sensed values Tie, Tic, Toe, Toc, and Ta are further sent to CPU 20. Control panel F1 is operable to set indoor temperature Tas and other functionalities. Defrost bypass valve SV-a is controlled by CPU 20 in the defrost cycle. Sensor B1 can sense the coil temperature of outdoor heat exchanger 23 (i.e., sensed values Toe (evaporation temperature of heating cycle) and Toc (condensation temperature of air conditioning cycle)). Sensor C1 can sense the coil temperature of indoor heat exchanger 27 (i.e., sensed values Tie (evaporation temperature of air conditioning cycle) and Tic (condensation temperature of heating cycle)). Sensor D1 can sense the ambient temperature of enclosed space A1 (i.e., sensed value Ta). The corresponding relationship between sensed values Tie, Tic, Toe, Toc, and Ta and default values Ties, Tics, Toes, Tocs, and Tas is as follows: (1) In air conditioning cycle: Ta is corresponding to Tas, Tie is corresponding to Ties, and Toc is corresponding to Tocs. (2) In heating cycle: Ta is corresponding to Tas, Tic is corresponding to Tics, and Toe is corresponding to Tocs.

Figure 4:
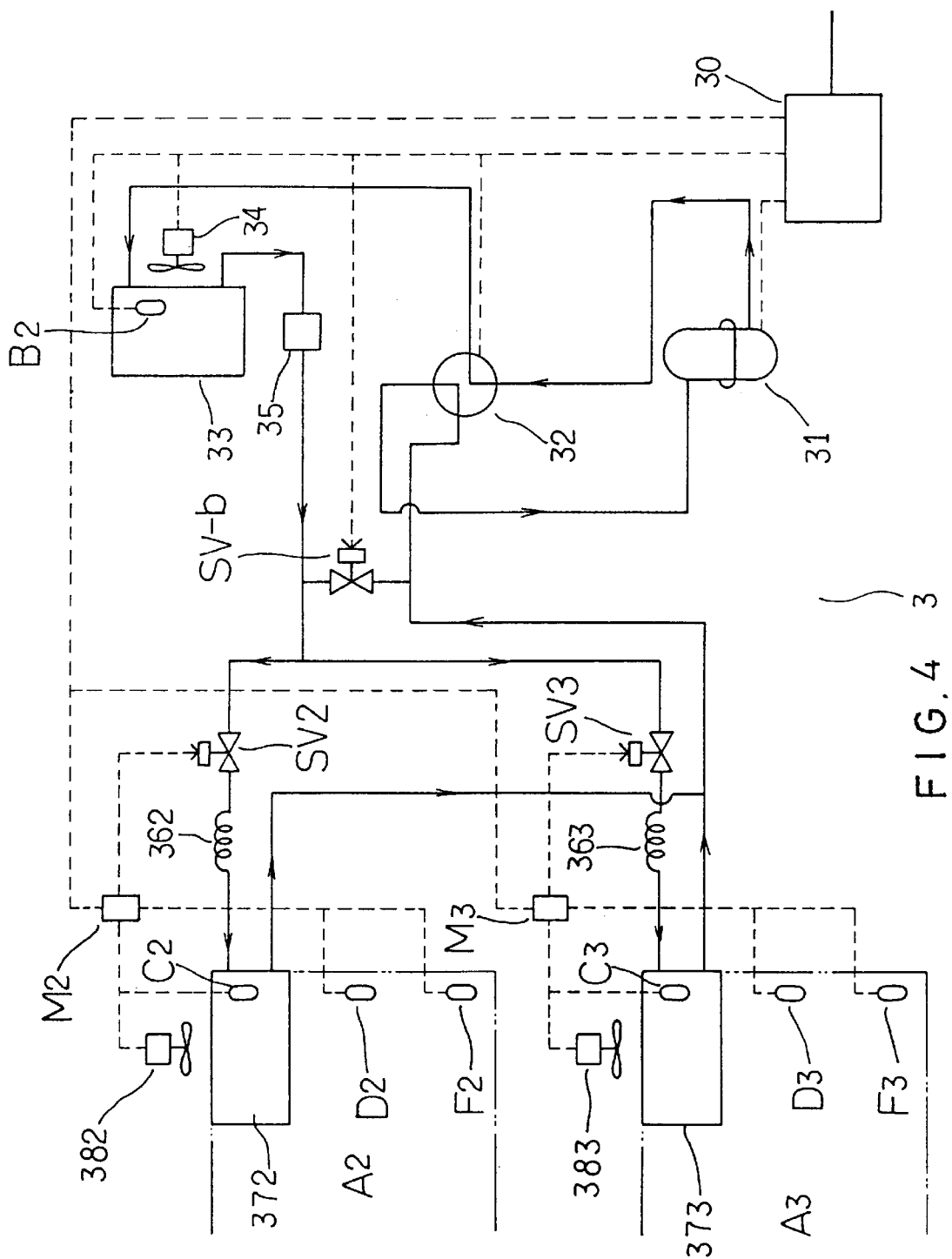
FIG. 4 is a schematic drawing of a second preferred embodiment of air conditioner/heater according to the invention.
Figure 5:
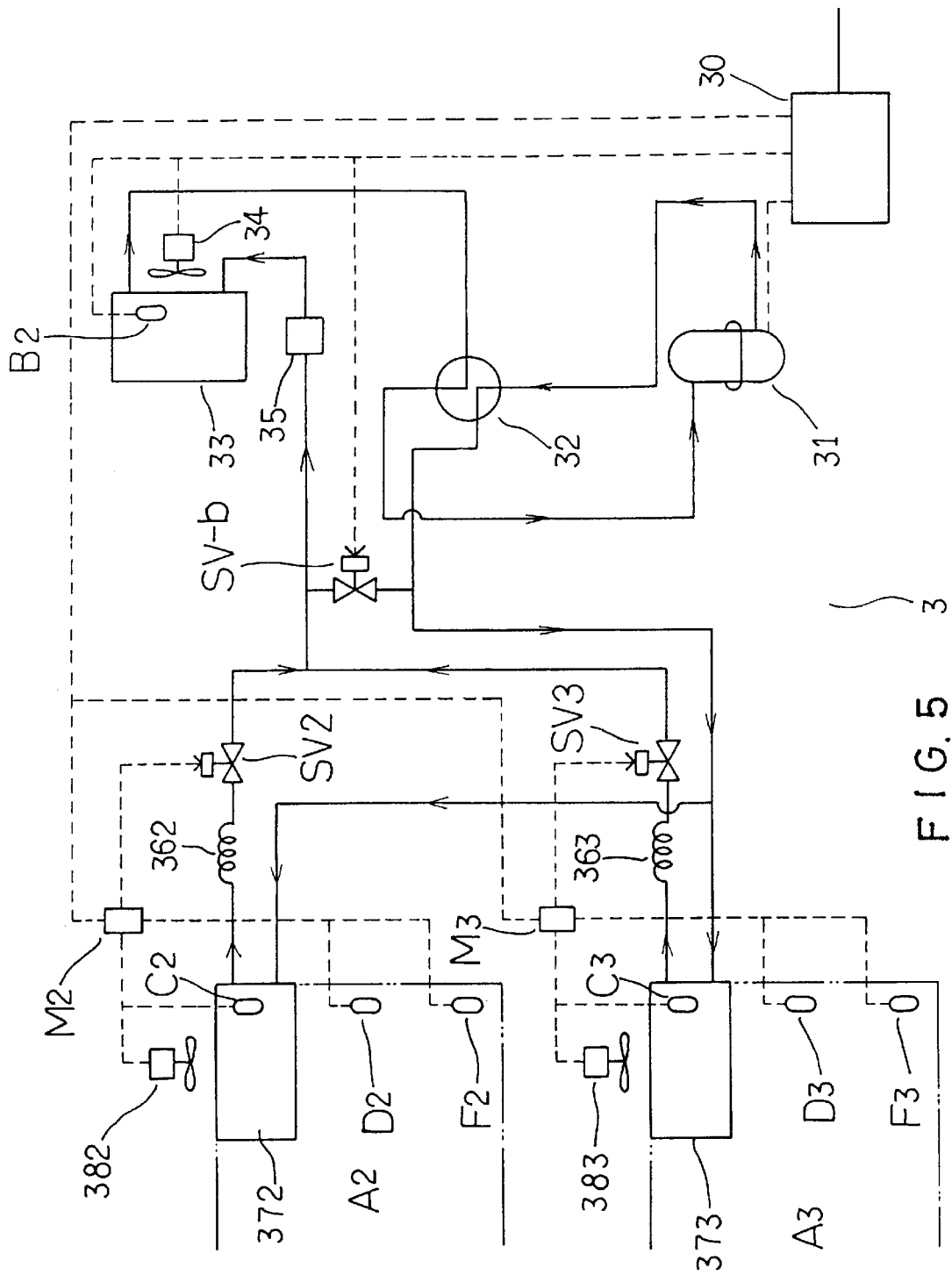
FIG. 5 is another schematic drawing of the second preferred embodiment shown in FIG. 4.

Referring to FIGS. 4 and 5, there is shown a second preferred embodiment of air conditioner/heater 3 constructed in accordance with the invention. The air conditioner/heater 3 is activated to air condition/heat a plurality of rooms. That is, this is a one-to-many mode. Air conditioner/heater 3 comprises a compressor 31, a heat exchanger 33, a fan motor 34, a filter 35, and a plurality of coolant flow controllers 362 and 363 (all above components are installed outside the enclosed spaces A2 and A3). Air conditioner/heater 3 further comprises a plurality of heat exchangers 372 and 373 and a plurality of fan motors 382 and 383 (all are installed in the enclosed spaces A2 and A3 respectively). Similar to the first embodiment, the air conditioner/heater 3 is controlled by a CPU 30 through associated components such as a directional-control valve 32, a defrost bypass valve SV-b, a plurality of sensors B2, C2, C3, D2, and D3, and a plurality of control panels F2 and F3. The differences between first and second embodiments are that the number of enclosed space is increased from one to more than one (e.g., A2, A3, . . . , An wherein A2 and A3 are shown). Coolant flow controller 362 and solenoid-controlled valve SV2 are located on the path of coolant flow of enclosed space A2. Coolant flow controller 363 and solenoid-controlled valve SV3 are located on the path of coolant flow of enclosed space A3. Controls M2 and M3 are controlled by CPU 30 for controlling the corresponding enclosed spaces A and A3 respectively, i.e., CPU 30 may control the activation of sensors C2, D2, C3, and D3, the on-off of solenoid-controlled valves SV2 and SV3, and the operations of fan motors 382 and 383. Compressor 31 and defrost bypass valve SV-b are also controlled by CPU 30. Control panels F2 and F3 are operable to set indoor temperature Tas and other functionalities in enclosed spaces A2 and A3 respectively. Solenoid-controlled valves SV2 and SV3 are commanded to control the coolant flow into respective enclosed spaces A2 and A3. The relationship among enclosed spaces A2 and A3, controls M2 and M3, and solenoid-controlled valves SV2 and SV3 is as follows: Control M2 and solenoid-controlled valve SV2 are located in enclosed space A2; and control M3 and solenoid-controlled valve SV3 are located in enclosed space A3. Ambient temperatures of enclosed spaces A2 and A3 (i.e., sensed values) are Ta2 and Ta3 respectively. The sensed values thereof are Tas2 and Tas3 respectively. The coil temperatures in enclosed spaces A2 and A3 are Tie2 and Tie3 respectively in air conditioning cycle with a default value Ties. The coil temperatures in enclosed spaces A2 and A3 are Tic2 and Tic3 respectively in heating cycle with a default value Tics. The coil temperatures outside enclosed spaces A2 and A3 are Toe and Toc respectively with default values Toes and Tocs. The corresponding relationship between sensed values and default values of respective enclosed spaces is as follows:

A: Ta is corresponding to Tas, Tie is corresponding to Ties, and Tic is corresponding to Tics;

A2: Ta2 is corresponding to Tas, Tie2 is corresponding to Ties, and Tic2 is corresponding to Tics;

A3: Ta3 is corresponding to Tas, Tie3 is corresponding to Ties, and Tic3 is corresponding to Tics; Toe is corresponding to Toes; and Toc is corresponding to Tocs.

Figure 6:
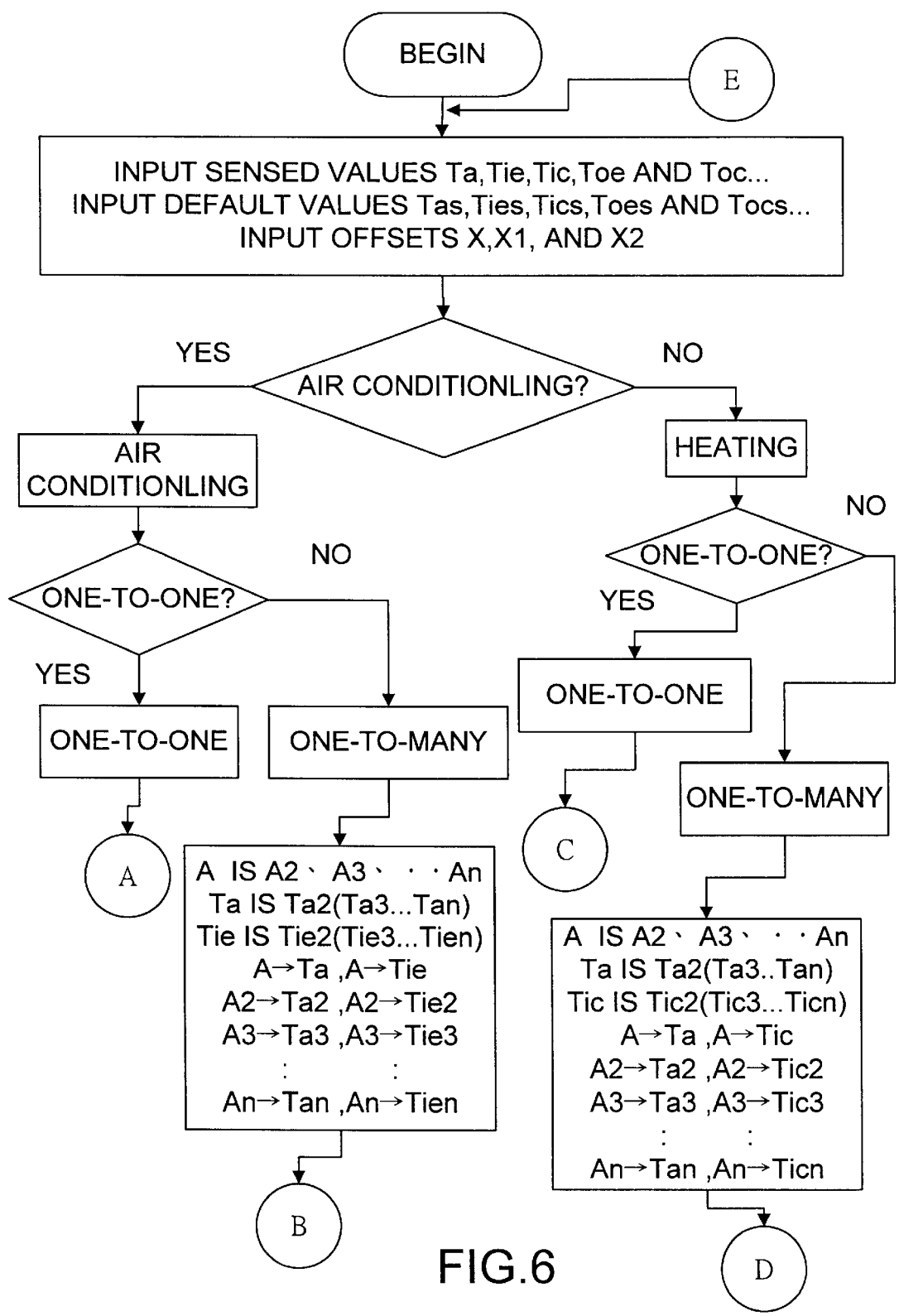
FIG. 6 is a first flow chart of the control process of the invention.
Figure 7A:
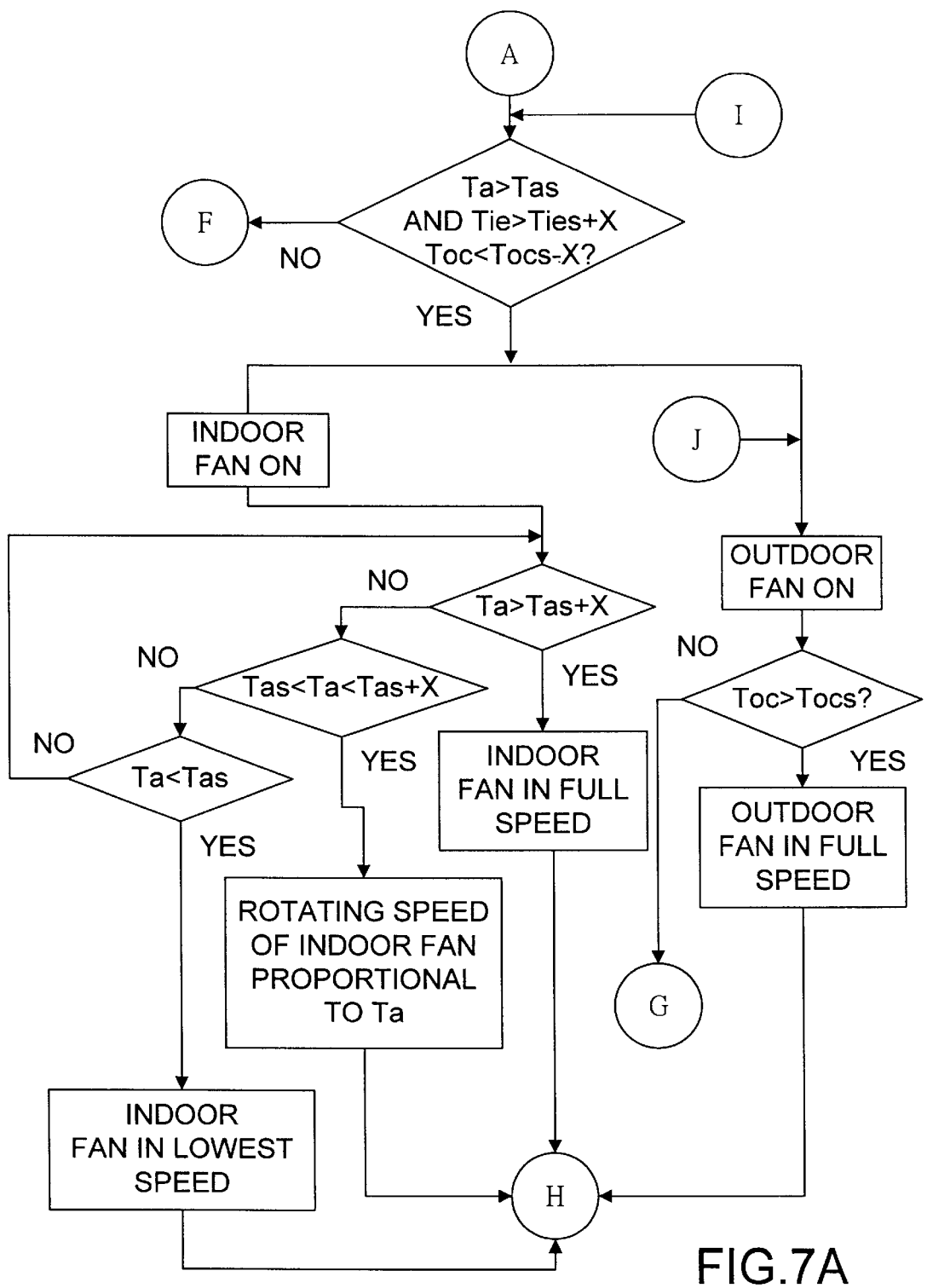
FIGS. 7A–7B show is a second flow chart of the control process of the invention.
Figure 7B:
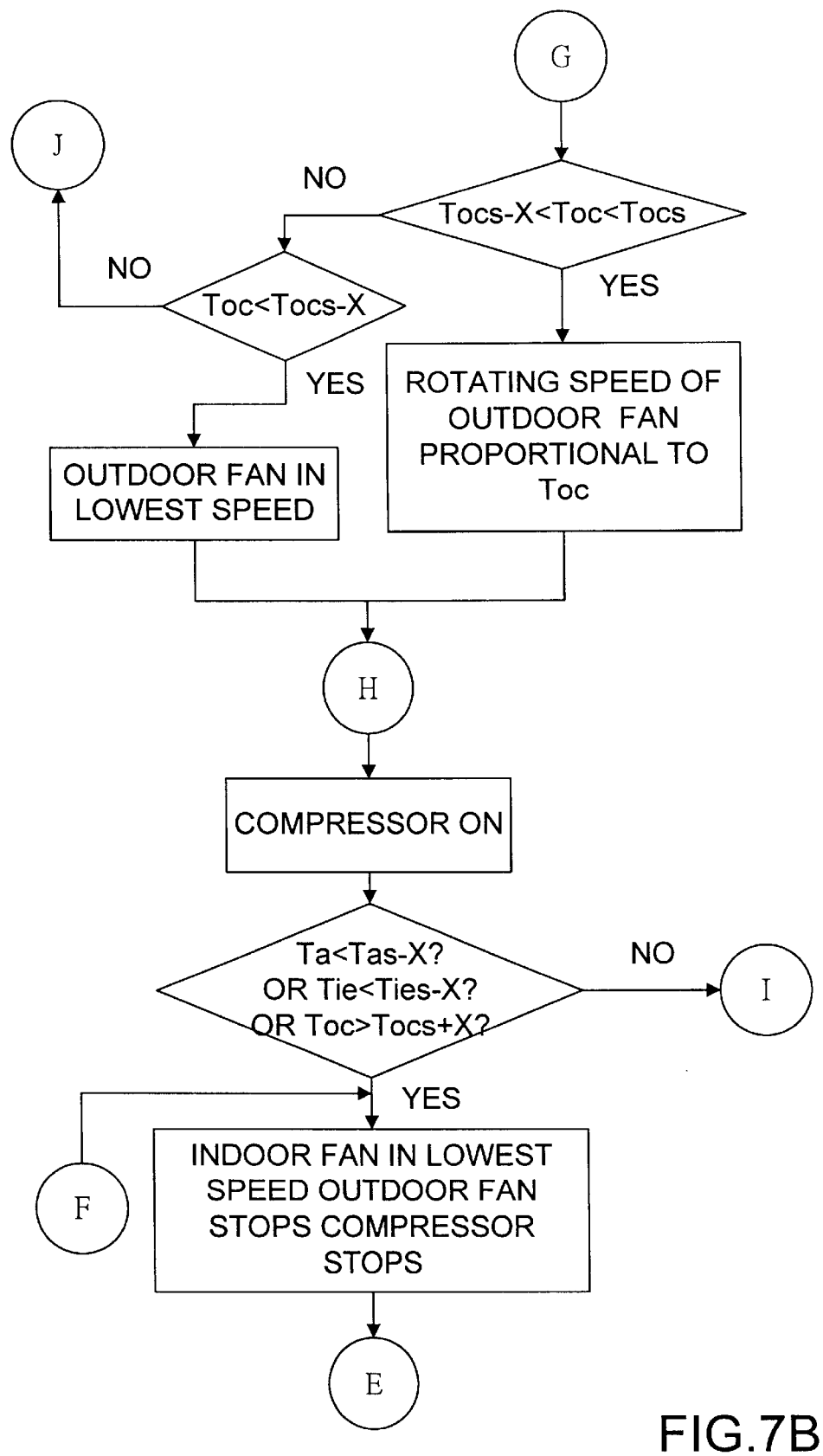
Figure 8A:
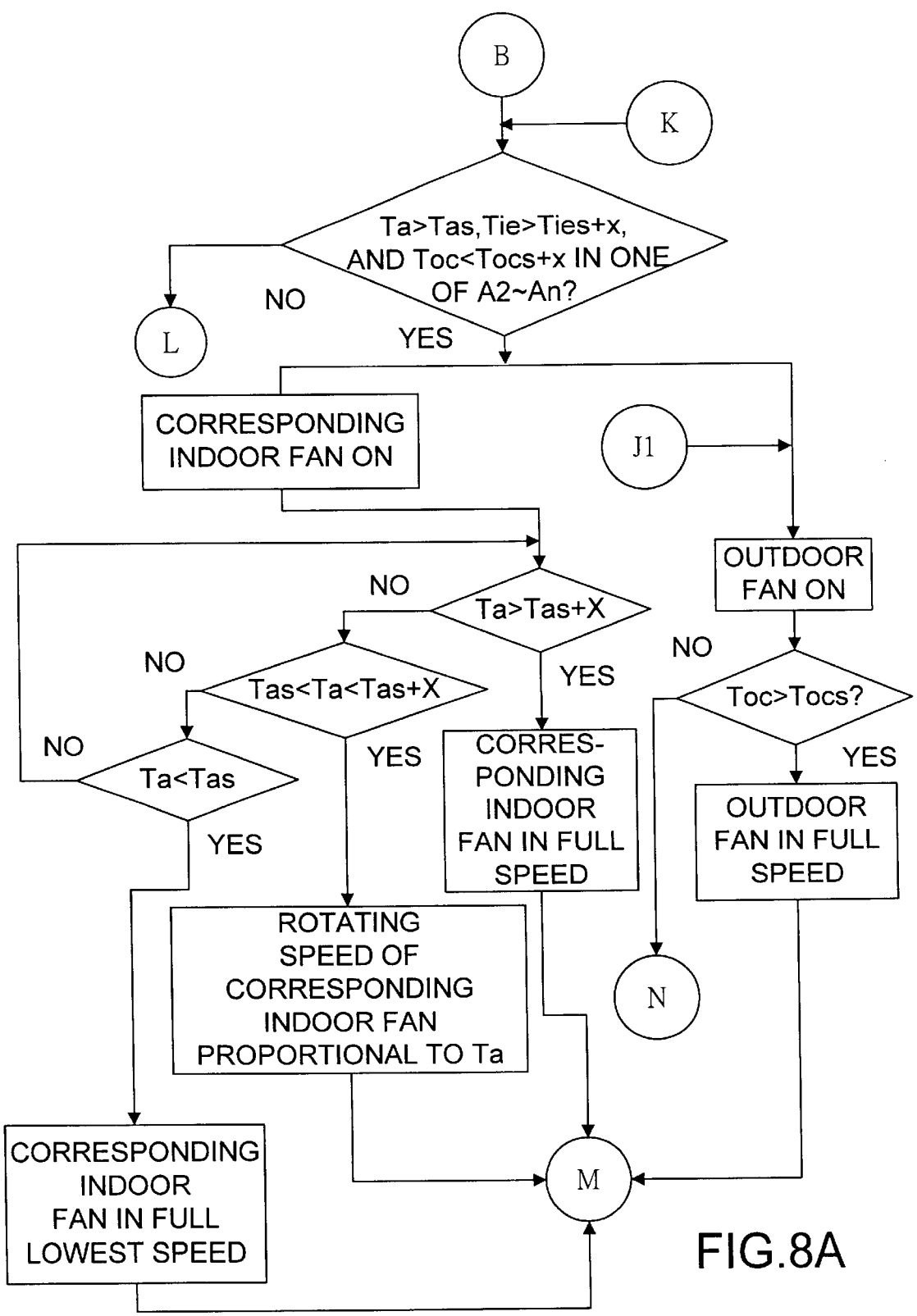
FIGS. 8A–8C show is a third flow chart of the control process of the invention.
Figure 8B:
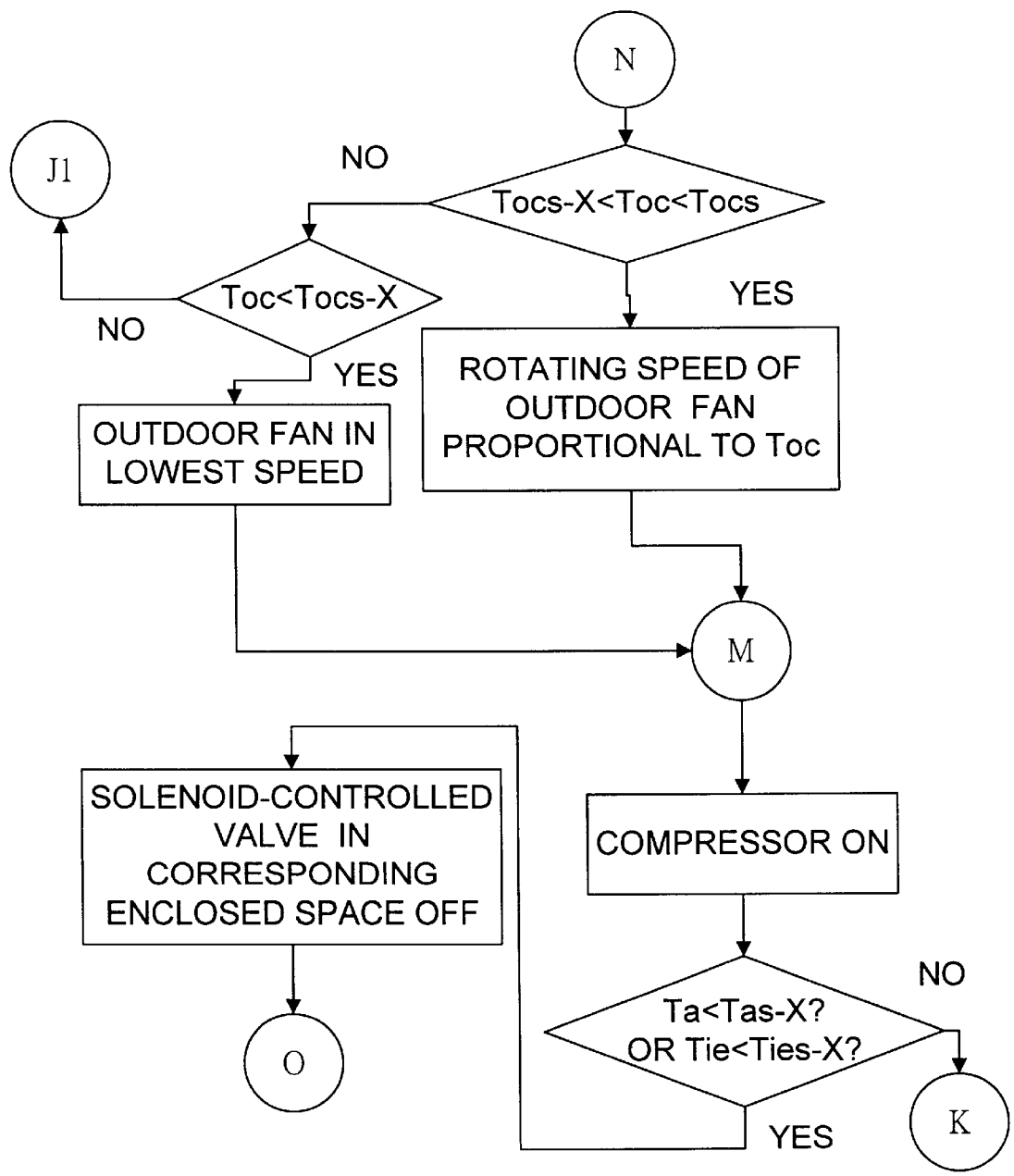
Figure 8C:
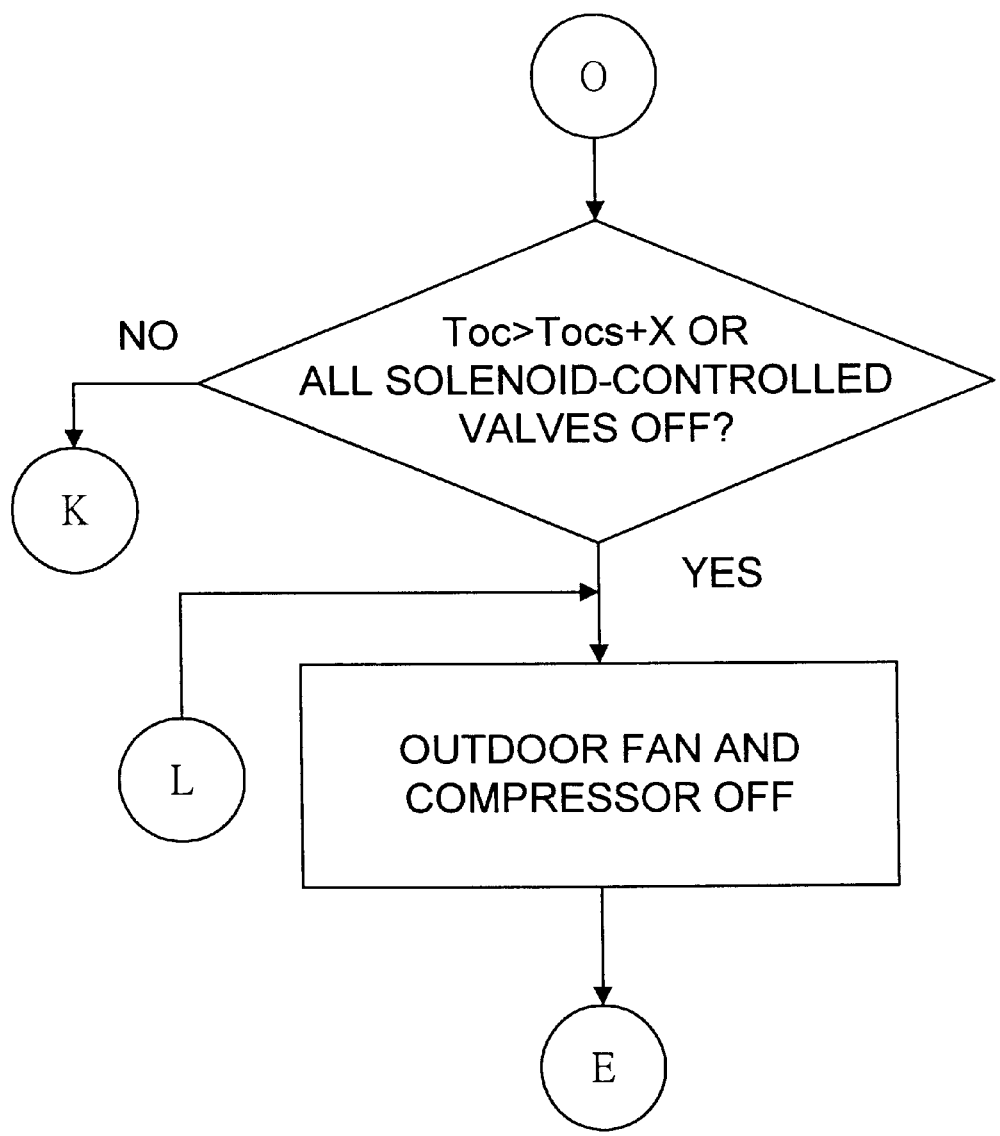
Figure 9A:
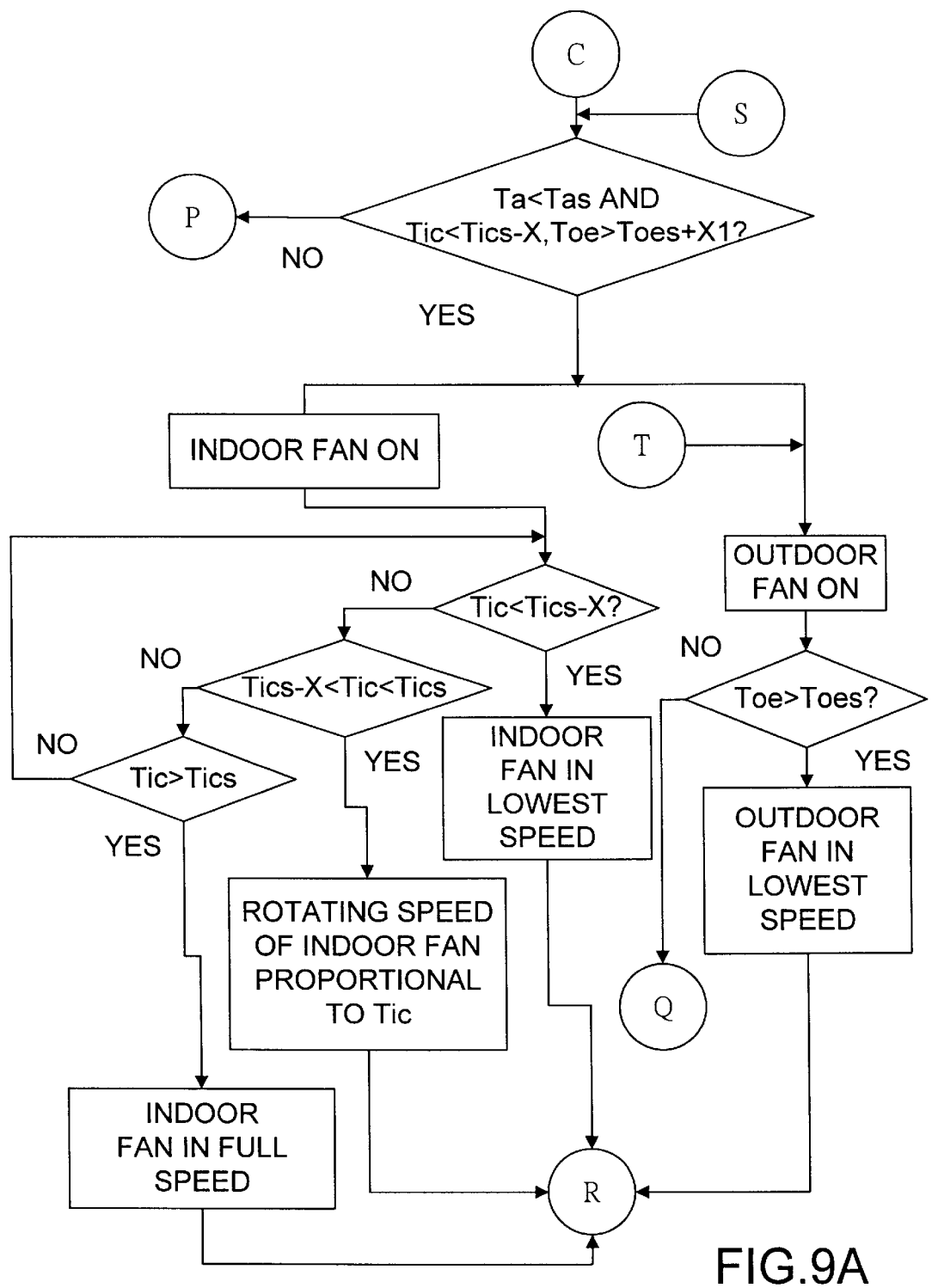
FIGS. 9A–9B show is a fourth flow chart of the control process of the invention.
Figure 9B:
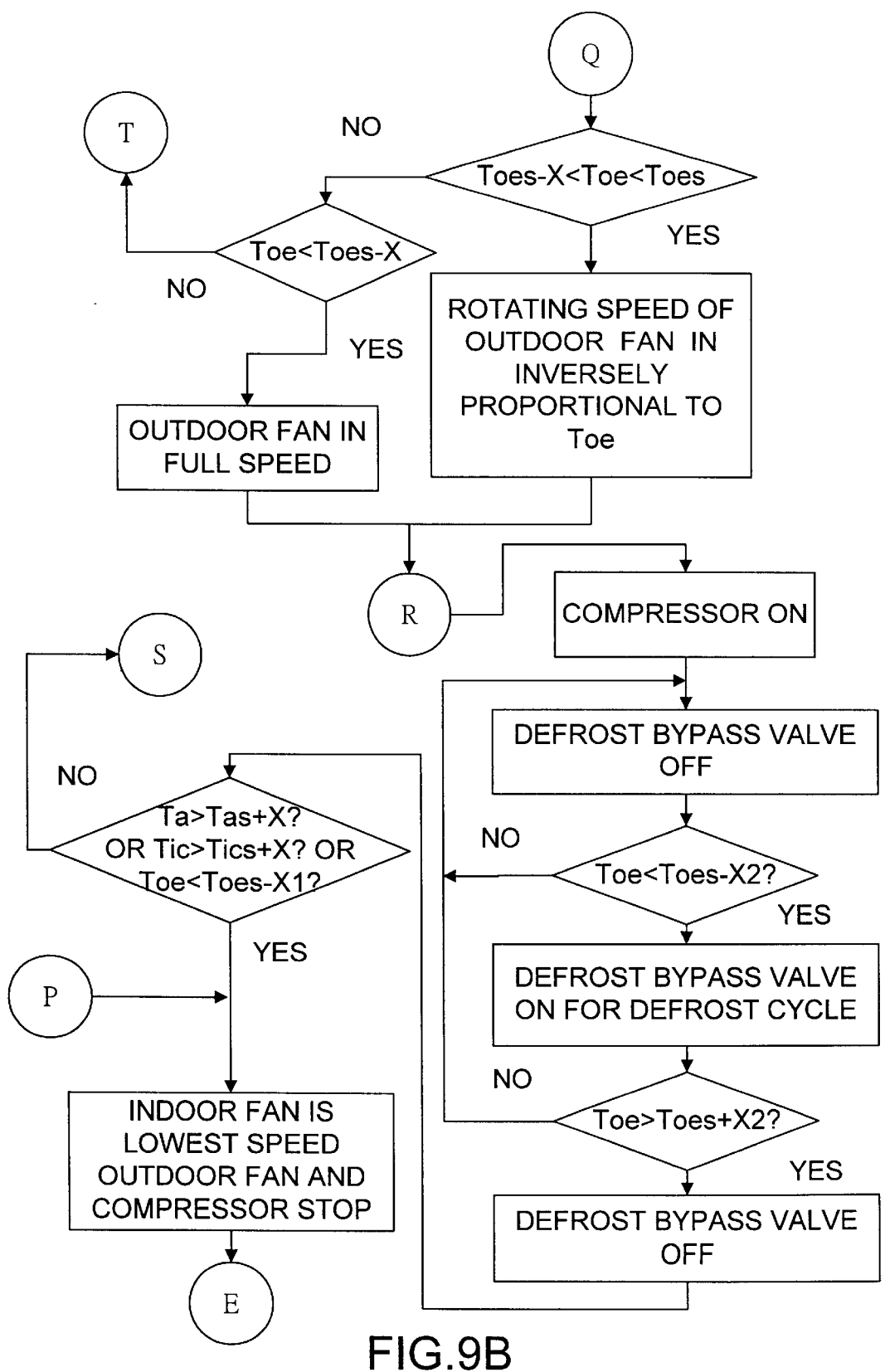
Figure 10A:
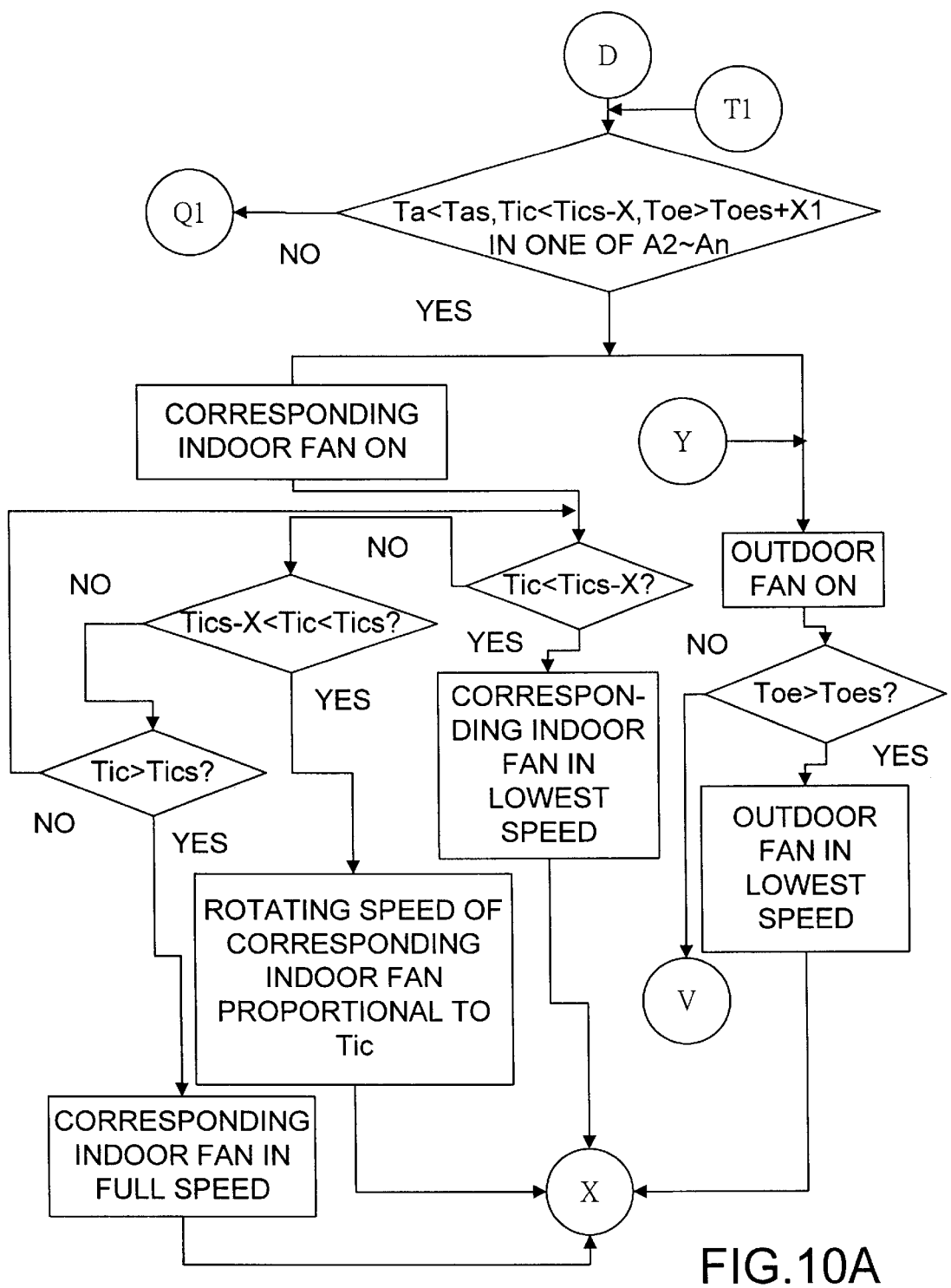
FIGS. 10A–10C show is a fifth flow chart of the control process of the invention.
Figure 10B:
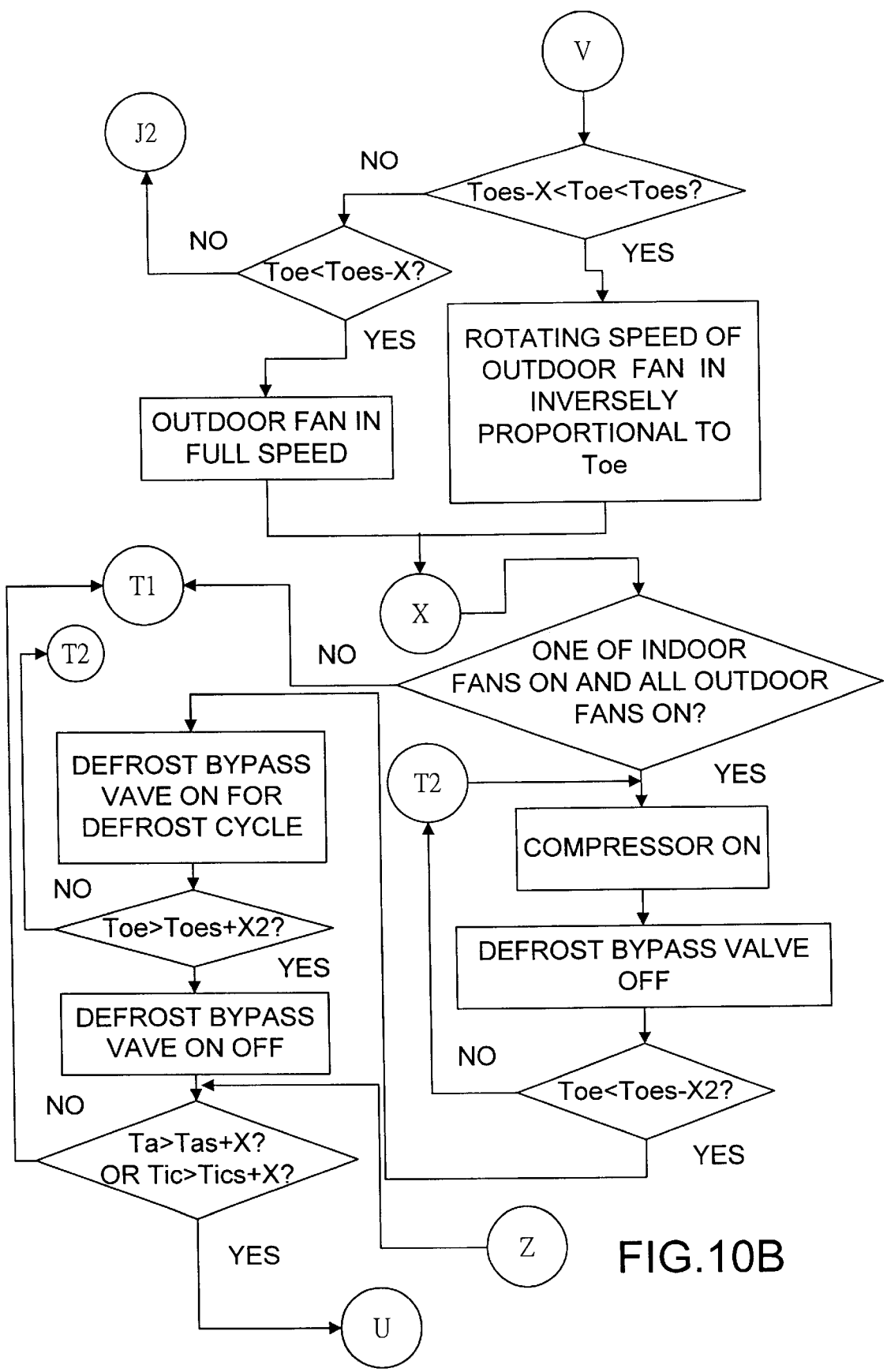
Figure 10C:
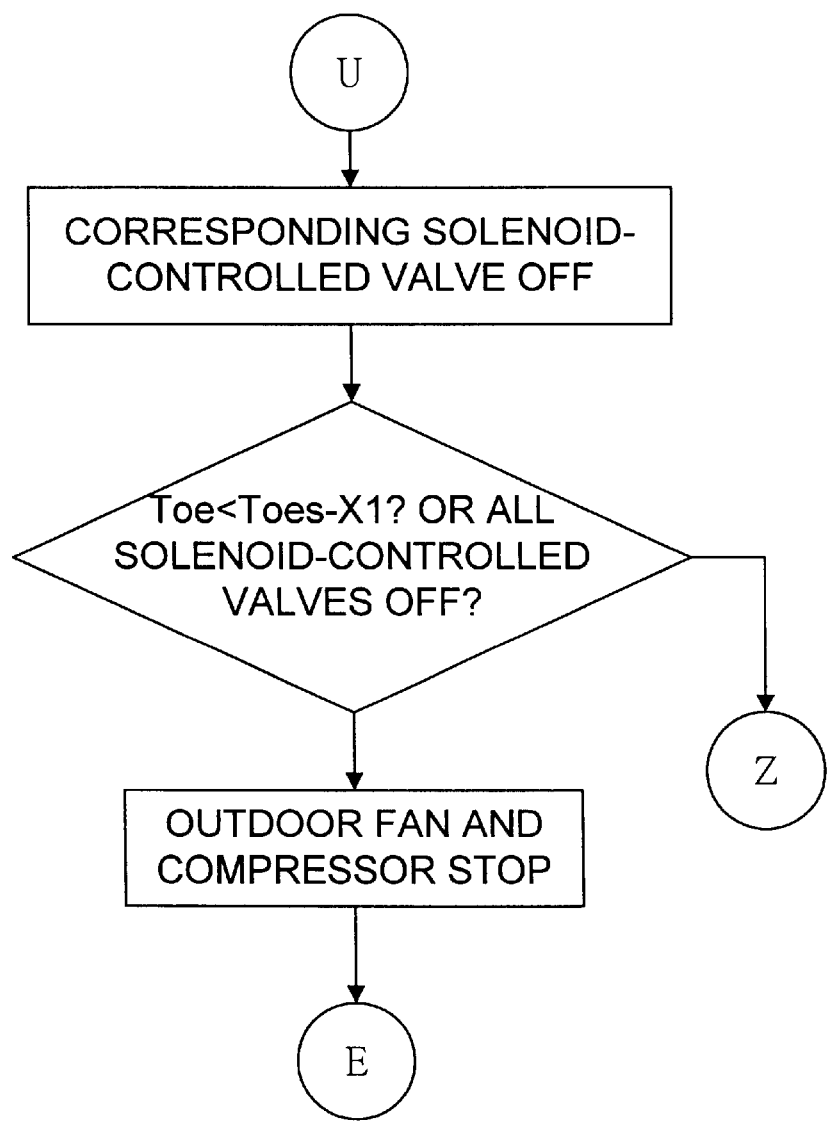
Figure 12:
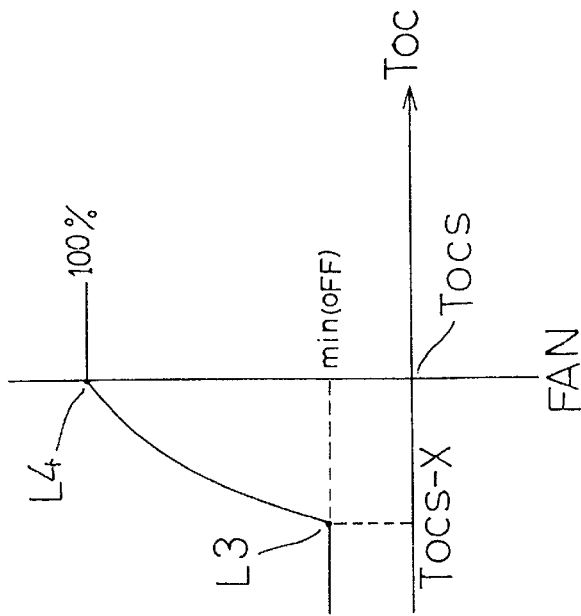
FIG. 12 is a graph illustrating the rotating speed of outdoor fan motor versus temperature in air conditioning mode.
Figure 11:
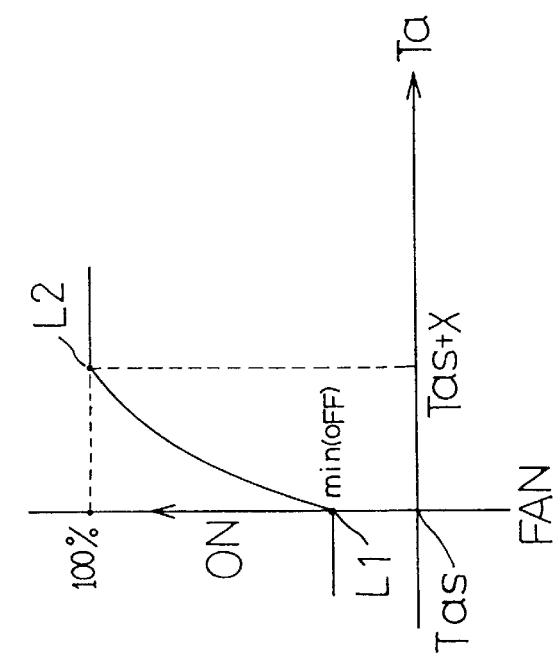
FIG. 11 is a graph illustrating the rotating speed of indoor fan motor versus temperature in air conditioning mode.
Figure 14:
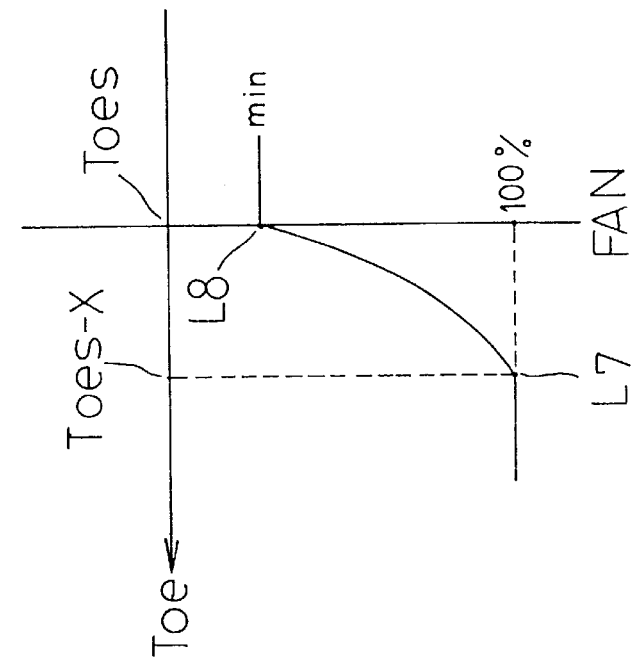
FIG. 14 is a graph illustrating the rotating speed of outdoor fan motor versus temperature in heating mode.
Figure 13:
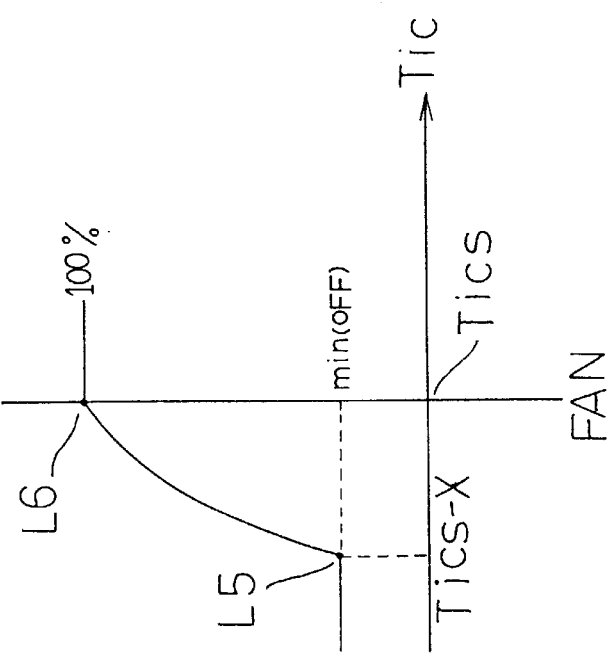
FIG. 13 is a graph illustrating the rotating speed of indoor fan motor versus temperature in heating mode.

Referring to FIGS. 6 to 10 in conjunction with FIGS. 11 to 20, flow charts of the control processes of first and second embodiments of the invention will now be described in detail. In FIG. 6, sensed values Ta, Tie, Tic, Toe, and Toc obtained from sensors B1, B2, B3, C1, C2, C3, D1, D2, and D3 are sent to CPU 20 (or 30) for comparison with default values Tas, Tics, Toes, and Tocs. Then a determination is made whether directional-control valve 22 (or 32) has switched to air conditioning cycle. If yes, process goes to air conditioning cycle, otherwise process goes to heating cycle. Next, a determination is made whether process is one-to-one or one-to-many with respect to respective cycles (i.e., air conditioning cycle and heating cycle). Then process jumps to A, B, C, or D corresponding to one of FIGS. 7 to 10 based on the result of above determination.

Following is a detailed description of air conditioning operation of the invention wherein switch valve 22 or 32 has switched to air conditioning cycle. One-to-one operation mode (see FIGS. 2 and 7):

(A) If ambient temperature of enclosed space A1 (i.e., sensed value Ta) is larger than Tas (i.e., Ta >Tas), the coil temperature of indoor heat exchanger (used as evaporator) 27 (i.e., sensed value Tie) is larger than the sum of default value Ties and default offset X (i.e., Tie>Ties+X), and the coil temperature of outdoor heat exchanger (used as condenser) 23 (i.e., sensed value Toc) is smaller than the subtraction of default offset X from default value Tocs (i.e., Toc <Toc−X), in case (a) indoor fan motor 28 starts to operate. If Ta>Tas+X, indoor fan motor 28 operates in full speed. If Tas<Ta<Tas+X, the rotating speed of indoor fan motor 28 is proportional to Ta (as indicated by line L1-L2 in FIG. 11). If Ta<Tas, indoor fan motor 28 operates in lowest speed; and in case (b) outdoor fan motor 24 starts to operate. If Toc>Tocs, outdoor fan motor 24 operates in full speed. If Tocs−X<Toc<Tocs, the rotating speed of outdoor fan motor 24 is proportional to Toc (as indicated by line L3-L4 in FIG. 12). If Toc<Tocs−X, outdoor fan motor 24 operates in lowest speed (or even stops).

Figure 15:
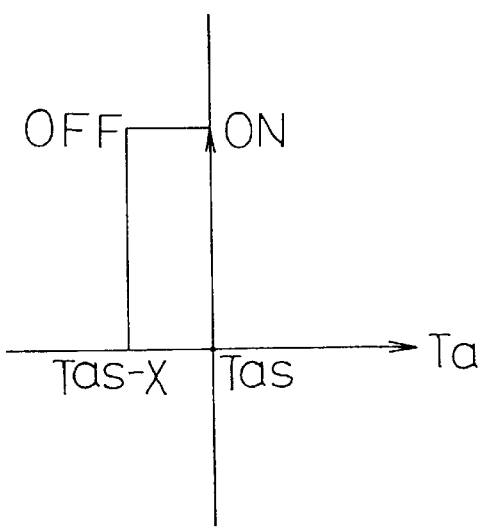
FIG. 15 is a first graph illustrating the operation of compressor.
Figure 16:
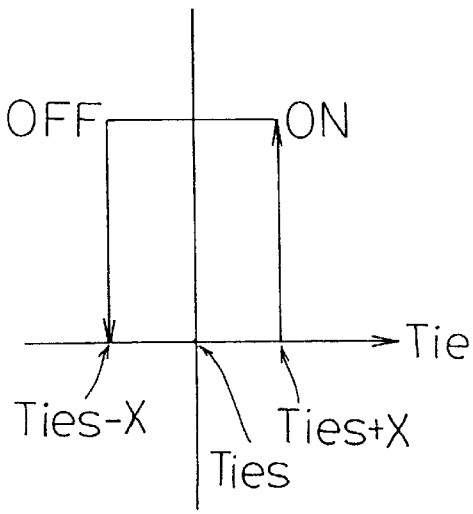
FIG. 16 is a second graph illustrating the operation of compressor.
Figure 17:
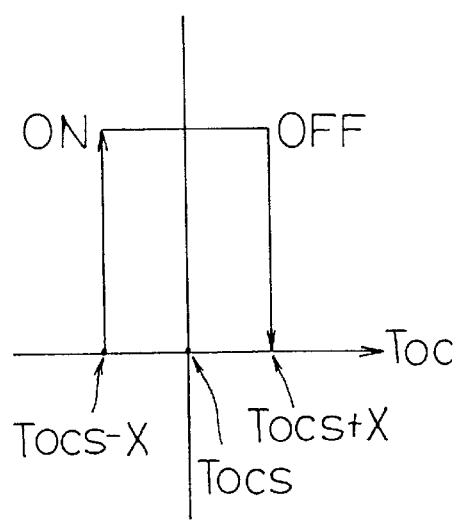
FIG. 17 is a third graph illustrating the operation of compressor.
Figure 18:
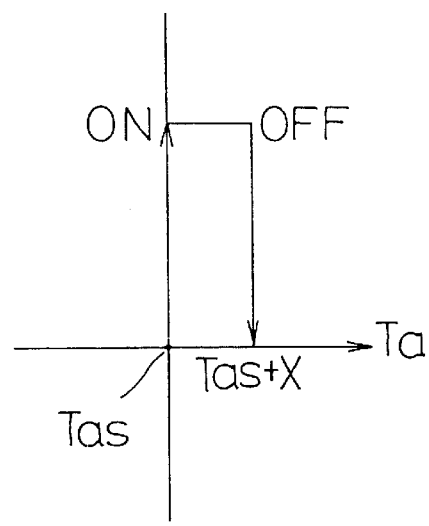
FIG. 18 is a fourth graph illustrating the operation of compressor.

(B) Compressor 21 begins to operate as fan motors 24 and 28 operate (FIGS. 15 to 17).

(C) If Ta<Tas−X, Tie<Ties−X, or Toc>Tocs+X, indoor fan motor 28 operates in lowest speed (or even stops), while outdoor fan motor 24 and compressor 21 stops (OFF).

One-to-many operation mode (see FIGS. 4 and 8):

(A) In any enclosed space An (where n is 2, 3, . . . , or n), if ambient temperature (i.e., sensed value Ta) is larger than Tas (i.e., Ta>Tas), the corresponding indoor coil temperature Tie is larger than the sum of default value Ties and default offset X (i.e., Tie>Ties+X), and Toc<Tocs−X, in case (a) indoor fan motor 382 (or 383) corresponding to enclosed space A2 (or A3) starts to operate. If Ta>Tas+X, indoor fan motor 382 (or 383) operates in full speed. If Tas<Ta<Tas+X, the rotating speed of indoor fan motor 382 (or 383) is proportional to Ta (as indicated by line L1-L2 in FIG. 11). If Ta<Tas, indoor fan motor 382 (or 383) operates in lowest speed; and in case (b) outdoor fan motor 34 starts to operate. If Toc>Tocs, outdoor fan motor 34 operates in full speed. If Tocs−X<Toc<Tocs, the rotating speed of outdoor fan motor 34 is proportional to Toc (as indicated by line L3-L4 in FIG. 12). If Toc<Tocs−X, outdoor fan motor 34 operates in lowest speed (or even stops).

(B) Compressor 31 begins to operate as fan motors 34 and 382 (or 383) operate (FIGS. 15 to 17).

(C) If Ta<Tas−X or Tie<Ties−X, the corresponding indoor solenoid-controlled valve SV2 (or SV3) is turned off.

(D) If Toc>Tocs+X or both solenoid-controlled valves SV2 and SV3 are closed, outdoor fan motor 34 and compressor 31 stops (OFF).

Following is a detailed description of heating operation of the invention wherein switch valve 22 or 32 has switched to heating cycle. One-to-one operation mode (see FIGS. 3 and 9):

(A) If ambient temperature of enclosed space A1 (i.e., sensed value Ta) is smaller than Tas (i.e., Ta<Tas), the coil temperature of indoor heat exchanger (used as evaporator) 27 (i.e., sensed value Tic) is smaller than the subtraction of default offset X from default value Tics (i.e., Tic<Tics−X), and the coil temperature of outdoor heat exchanger (used as condenser) 23 (i.e., sensed value Toc) is larger than the sum of default value Toes and a first default offset X (i.e., Toe>Toes+X1), in case (a) indoor fan motor 28 starts to operate. If Tic<Tics−X, indoor fan motor 28 operates in lowest speed −X<Tic<Tics, the rotating speed of indoor fan motor 28 is proportional to Tic (as indicated by line L5-L6 in FIG. 13). If Tic>Tics, indoor fan motor 28 operates in full speed; and in case (b) outdoor fan motor 24 starts to operate. If Toe>Toes, outdoor fan motor 24 operates in lowest speed. If Toes−X<Toe<Toes, the rotating speed of outdoor fan motor 24 is inversely proportional to Toe (as indicated by line L7-L8 in FIG. 14). If Toe<Toes−X, outdoor fan motor 24 operates in full speed.

(B) Compressor 21 begins to operate as fan motors 24 and 28 operate (FIGS. 18 to 20), while defrost bypass valve SV-a is off.

(C) If Toe<Toes−X2 (where X2 is a second default offset), defrost bypass valve SV-a is turned on (ON) to enter into defrost cycle (as indicated by dashed line X2—X2 in FIG. 20).

(D) If Toe>Toes+X2, defrost bypass valve SV-a is turned off (OFF).

(E) If Ta>Tas+X, Tic>Tics+X, or Toe<Toes−X1, indoor fan motor 28 operates in lowest speed (or even stops), while outdoor fan motor 24 and compressor 21 stops (OFF).

One-to-many operation mode (see FIGS. 5 and 10):

(A) In any enclosed space An (where n is 2, 3, . . . , or n), if ambient temperature (i.e., sensed value Ta) is smaller than Tas (i.e., Ta<Tas), the corresponding indoor coil temperature (sensed value Tic) is smaller than the subtraction of default offset X from default value Tics (i.e., Tic<Tics−X), and Toe>Toes+X1, in case (a) indoor fan motor 382 (or 383) corresponding to enclosed space A2 (or A3) starts to operate. If Tic<Tics−X, indoor fan motor 382 (or 383) operates in lowest speed (or even stops). If Tics−X<Tic<Tics, the rotating speed of indoor fan motor 382 (or 383) is proportional to Tic (as indicated by line L5-L6 in FIG. 13). If Tic>Tics, indoor fan motor 382 (or 383) operates in full speed; and in case (b) outdoor fan motor 34 starts to operate. If Toe>Toes, outdoor fan motor 34 operates in lowest speed. If Toes−X<Toe<Toes, the rotating speed of outdoor fan motor 34 is inversely proportional to Toe (as indicated by line L7-L8 in FIG. 14). If Toe<Toes−X, outdoor fan motor 34 operates in full speed.

(B) Compressor 31 begins to operate as fan motors 34 and 382 (or 383) operate (FIGS. 18 to 20), while defrost bypass valve SV-b is turned off.

(C) If Toe<Toes−X2, defrost bypass valve SV-b is turned on (ON) to enter into defrost cycle (as indicated by dashed line X2—X2 in FIG. 20).

(D) If Toe>Toes+X2, defrost bypass valve SV-b is closed (OFF).

(E) If Ta>Tas+X or Tic>Tics+X, the corresponding solenoid-controlled valve SV2 (or SV3) is turned off.

(F) If Toe<Toes−X1, or both solenoid-controlled valves SV2 and SV3 are closed, outdoor fan motor 34 and compressor 31 stops (OFF).

In brief, the air conditioner/heater of the invention can automatically operate in either air conditioning or heating mode by coil temperatures of indoor and outdoor heat exchangers wherein in air conditioning mode, the rotating speed of indoor fan motor is proportional to the ambient temperature of corresponding enclosed space, and the rotating speed of outdoor fan motor is proportional to the coil temperature of corresponding outdoor heat exchanger; and in heating mode, the rotating speed of indoor fan motor is proportional to the coil temperature of corresponding indoor heat exchanger, and the rotating speed of outdoor fan motor is inversely proportional to the coil temperature of corresponding outdoor heat exchanger. With this automatic switching of operation mode, the capability of heat dissipation of condenser is always larger than the capability of heat absorption of evaporator. Hence, the operation of the air conditioner/heater is always maintained at an optimum, resulting in an increase of operational efficiency as well as energy saving.

While the invention has been described by means of specific embodiments, numerous modifications and variations could be made thereto by those skilled in the art without departing from the scope and spirit of the invention set forth in the claims.

What is claimed is:

1. A process for controlling an air conditioner/heater to switch to operate in either an air conditioning mode or a heating mode, said process comprising the steps of:

1) in said air conditioning mode: sending ambient temperature of at least one enclosed space sensed by at least one sensor to a central processing unit (CPU) for comparison with a predetermined value so that said rotating speed of each of at least one indoor fan motor is proportional to said ambient temperature of said corresponding enclosed space when said ambient temperature of said enclosed space is larger than said predetermined value but smaller than sum of said predetermined value and a first predetermined offset;

2) in said air conditioning mode: sending at least one outdoor coil temperature sensed by said at least one sensor to said CPU for comparison with said predetermined value so that said rotating speed of each of at least one outdoor fan motor is proportional to said corresponding outdoor coil temperature when said outdoor coil temperature is smaller than said predetermined value but larger than subtraction of said first predetermined offset from said predetermined value;

3) in said heating mode: sending at least one indoor coil temperature sensed by said at least one sensor to said CPU for comparison with said predetermined value so that said rotating speed of each indoor fan motor is proportional to said corresponding indoor coil temperature when said indoor coil temperature is smaller than said predetermined value but larger than said subtraction of said first predetermined offset from said predetermined value; and 4) in said heating mode: sending said at least one outdoor coil temperature sensed by said at least one sensor to said CPU for comparison with said predetermined value so that said rotating speed of each outdoor fan motor is inversely proportional to said corresponding outdoor coil temperature when said outdoor coil temperature is smaller than said predetermined value but larger than said subtraction of said first predetermined offset from said predetermined value.

2. The process of claim 1, wherein in said step 1) said rotating speed of said indoor fan motor is a maximum when said ambient temperature of said corresponding enclosed space is larger than said sum of said predetermined value and said first predetermined offset.

3. The process of claim 1, wherein in said step 1) said rotating speed of said indoor fan motor is a minimum when said ambient temperature of said corresponding enclosed space is smaller than said predetermined value.

4. The process of claim 1, wherein in said step 2) said rotating speed of said outdoor fan motor is a maximum when said outdoor coil temperature is larger than said predetermined value.

5. The process of claim 1, wherein in said step 2) said rotating speed of said outdoor fan motor is a minimum when said outdoor coil temperature is smaller than said subtraction of said first predetermined offset from said predetermined value.

6. The process of claim 1, wherein in said step 3) said rotating speed of said indoor fan motor is a maximum when said indoor coil temperature is larger than said predetermined value.

7. The process of claim 1, wherein in said step 4) said rotating speed of said indoor fan motor is a minimum when said indoor coil temperature is smaller than said subtraction of said first predetermined offset from said predetermined value.

8. The process of claim 1, wherein in said step 4) said rotating speed of said outdoor fan motor is a maximum when said outdoor coil temperature is smaller than said subtraction of said first predetermined offset from said predetermined value.

9. The process of claim 1, wherein in said step 4) said rotating speed of said outdoor fan motor is a minimum when said outdoor coil temperature is larger than said predetermined value.

10. The process of claim 1, further comprising a solenoid-controlled valve, wherein in said step 4) said solenoid-controlled valve is activated to cause said air conditioner/heater to enter into a defrost cycle when said outdoor coil temperature is smaller than subtraction of a second predetermined offset from said predetermined value, and said solenoid-controlled valve is deactivated to cause said air conditioner/heater to terminate said defrost cycle when said outdoor coil temperature is larger than sum of said predetermined value and said second predetermined offset.

* * * * *